(12) United States Patent
Rose et al.

(10) Patent No.: US 6,202,140 B1
(45) Date of Patent: Mar. 13, 2001

(54) MEMORY ADDRESSING SYSTEM AND METHOD THEREFOR

(75) Inventors: Jerry Michael Rose, Phoenix; David Evoy, Tempe, both of AZ (US)

(73) Assignee: Philips Semiconductor Inc., Tarrytown, NY (US)

( * ) Notice: Subject to any disclaimer, the term of this patent is extended or adjusted under 35 U.S.C. 154(b) by 0 days.

(21) Appl. No.: 09/120,757

(22) Filed: Jul. 22, 1998

(51) Int. Cl.$^7$ ...................................................... G06F 12/00
(52) U.S. Cl. ........................... 711/200; 711/211; 711/220; 365/189.02; 365/230.01; 365/230.02; 710/126; 710/128; 710/129
(58) Field of Search ..................................... 711/200, 211, 711/220; 365/189.02, 230.01, 230.02; 710/126, 128, 129

(56) References Cited

U.S. PATENT DOCUMENTS

| | | | | |
|---|---|---|---|---|
| 5,262,991 | * | 11/1993 | Pope ................................. | 365/189.02 |
| 5,359,717 | * | 10/1994 | Bowles et al. ........................ | 710/129 |
| 5,483,660 | * | 1/1996 | Vishay et al. ..................... | 365/189.02 |
| 5,754,886 | * | 5/1998 | Taguri ................................... | 395/886 |
| 5,805,843 | * | 9/1998 | Gehlhaar .............................. | 395/309 |
| 5,944,806 | * | 8/1999 | Melvin et al. ........................ | 710/126 |

* cited by examiner

Primary Examiner—Eddie P. Chan
Assistant Examiner—Kimberly McLean

(57) ABSTRACT

An improved memory addressing system has a CPU having both an address bus and a multiplexed data/address bus. A reduced PIN out companion chip is coupled to the multiplexed data/address bus for decoding data and low order address information. Memory storage is coupled to a high order address bus for receiving a high order address from the CPU, and to the low order address bus and data bus for receiving decoded low order address and data information from the companion chip.

16 Claims, 3 Drawing Sheets

COMBINED MULTIPLEX AND PARALLEL BUS SYSTEM

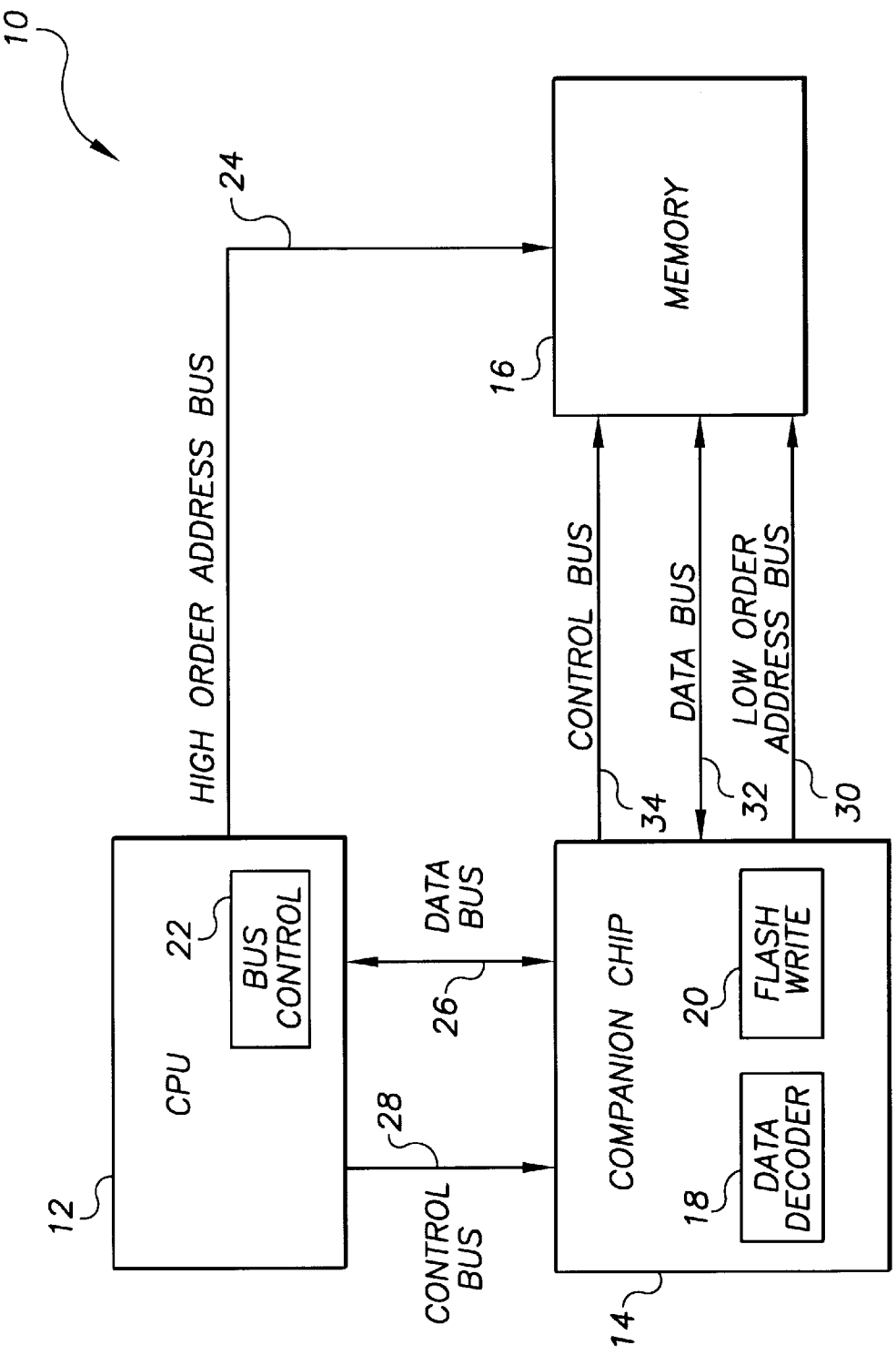
FIG.5 COMBINED MULTIPLEX AND PARALLEL BUS SYSTEM

MEMORY ADDRESSING SYSTEM AND METHOD THEREFOR

FIELD OF THE INVENTION

This invention is in the field of memory addressing systems and methods therefor, and more particularly, is a system and method for decreasing the PIN count of a companion chip while increasing the address space and memory map flexibility between the CPU, memory and other coupled peripheral devices.

BACKGROUND OF THE INVENTION

Architecture

In a traditional computer system, the Central Processing Unit (CPU) will generate an address on an address bus and then read or write data on a separate data bus. This is denoted as a parallel bus architecture and is depicted in FIG. 3. A control bus from the CPU runs parallel to the address bus and the data bus to provide signals for such things as ADDRESS_VALID and control whether the cycle is a READ or a WRITE operation. The control bus and data bus then typically connect to a controller, or companion chip, which is designed to communicate to devices such as ROM, SRAM, DRAM or other peripherals such as graphics cards and modems. A companion chip is required in most systems because even though a CPU can communicate with many different devices, it cannot do so well, nor can a CPU communicate with all types of devices. A typical timing diagram for a parallel bus architecture is shown in FIG. 1. If the CPU can directly support ROM accesses, (for instance the Pentium can not), the parallel bus architecture, as shown in FIG. 3, can significantly reduce the size of the companion chip because an address bus does not need to be routed via a companion chip as is required in a multiplexed system. The parallel bus method also results in a flexibility in designing how much ROM address space can be attached to the CPU.

The disadvantage to a parallel bus architecture is a reduction of flexibility in the memory map. This reduction in this configuration occurs because it is not possible for the companion chip to see the addresses when the CPU communicates with the ROM thus resulting in a loss of the ability to control how far into ROM space the CPU is addressing.

In an alternative design, some CPUs have their architecture designed to eliminate the separate address bus in order to reduce the PIN count. This method is attractive due to the smaller numbers of PINs which translate directly to a less expensive device due to cheaper package, smaller die etc. This alternative design uses a multiplexed address/data bus. The multiplexed address/data bus has multiple cycles with the first cycle being address and command, the second being data. A typical timing diagram for a multiplex bus architecture is shown in FIG. 2, and a multiplexed bus architecture is depicted in FIG. 4. This method has the advantage of a smaller PIN out count from the CPU, and also results in the ability of the companion chip to see the entire address space as the CPU accesses it and can thus use the CPU address space efficiently by allocating it to other devices. For example, if the ROM space is greater than 2 Mbytes in size, but ROM is 2 Mbytes is size, other devices can be mapped at the address 2 MEG+1.

This design also has its disadvantages however. When dealing with devices that cannot operate in a multiplex mode and which require a parallel bus architecture, such as ROM and FLASH memory, the companion chip must now have an address bus included in the package to be able to communicate to the ROM. This results in a larger companion chip die and package size due to the number of PINs required to generate an address bus and the cost per companion chip goes up. For example, 2 Megabytes of ROM, addressed as a byte addressable ROM, requires that 21 PINs be added to the companion chip package, and if an extremely large ROM space existed, such as on the order of 64 MEG, as many as 26 address PINs would need to be added to the companion chip in order to actually address the ROM. An additional drawback to a multiplexed bus architecture is that once the size of the address bus from the companion chip is set, larger address ROMs or devices that would require additional PINs for the increase in the address bus width cannot be used.

A modification to the multiplexed bus design is to add an address bus from the CPU to the ROM, and program the CPU so that when communicating to the ROM, the CPU will not use the multiplex mode, but instead will function in a parallel bus mode. This modification creates a number of its own problems however. As previously discussed, while communicating to the ROM in this mode, the companion chip is not receiving nor decoding the address information. So, again, this results is a loss of having a flexible memory map, thus losing the ability to control how far into ROM space the CPU is addressing.

Therefor, a need existed to provide an improved system and method of addressing memory and other peripheral devices, such as ROM. The improved system and method of addressing memory and other peripheral devices would make it possible for the companion chip to see the addresses when the CPU communicates with the ROM thus resulting in the ability to control how far into ROM space the CPU is addressing. Additionally, a need existed to limit the number of PINs required to be added to a companion chip for the multiplex mode of operation while still providing for an acceptable and flexible address space from a CPU to ROM and other peripheral devices.

SUMMARY OF THE INVENTION

The present invention provides an improved memory addressing system for addressing peripheral devices such as ROM and an approach that makes it possible for the companion chip to see the addresses when the CPU communicates with the ROM.

The present invention further provides a system and method that will limit the number of PINs required to be added to a companion chip for the multiplex mode of operation while still providing for an acceptable flexible address space from a CPU to ROM and other peripheral devices

BRIEF DESCRIPTION

In accordance with one example embodiment of the present invention, an improved memory addressing system comprises a CPU having an address bus and a multiplexed data/address bus, a companion chip, and memory storage. The companion chip is coupled to the multiplexed data/address bus for receiving and for decoding a low order address from the multiplexed data/address bus. The memory storage is coupled to the address bus for receiving a high order address from the address bus, and coupled to the companion chip for receiving the low order address. The companion chip further comprises a data decoding device for decoding data from the multiplexed data/address bus and a FLASH write circuit. The improved memory addressing system further comprises a data bus coupled to the companion chip and to the memory storage for transmission of the data between the companion chip and the memory storage, and a low order address bus coupled to the companion chip and to the memory storage for transmitting the low order address from the companion chip to the memory storage. The memory storage comprises non-volatile memory comprised of ROM or FLASH memory. The CPU further comprises transmitting control circuitry for transmitting information on both of the multiplexed data/address bus and the address bus at substantially the same time. The improved memory addressing system further comprises a low order address bus coupled to the companion chip and to the memory storage for transmitting the low order address from the companion chip to the memory storage.

In accordance with another embodiment of the present invention, an improved memory addressing method is disclosed comprising, the steps of providing a CPU having both an address bus and a multiplexed data/address bus wherein the CPU transmits information on both of the address bus and the multiplexed data/address bus at substantially the same time, providing a companion chip coupled to the multiplexed data/address bus for receiving and for decoding a low order address from the multiplexed data/address bus, and providing memory storage coupled to the address bus for receiving a high order address from the address bus and to the companion chip for receiving the low order address from the companion chip. The method further comprises the steps of providing data decoding for decoding data from the multiplexed data/address bus, providing a data bus coupled to the companion chip and to the memory storage for transmission of the data between the companion chip and the memory storage, and providing a low order address bus coupled to the companion chip and to the memory storage for transmitting the low order address from the companion chip to the memory storage.

The foregoing and other objects, features and advantages of the invention will be apparent from the following, more particular, description of the example embodiments of the invention, as illustrated in the accompanying drawings.

BRIEF DESCRIPTION OF THE DRAWING

FIG. 5 is simplified functional block diagram of a Combined Multiplex And Parallel Bus System of the present invention.

DETAILED DESCRIPTION

Figure 1:
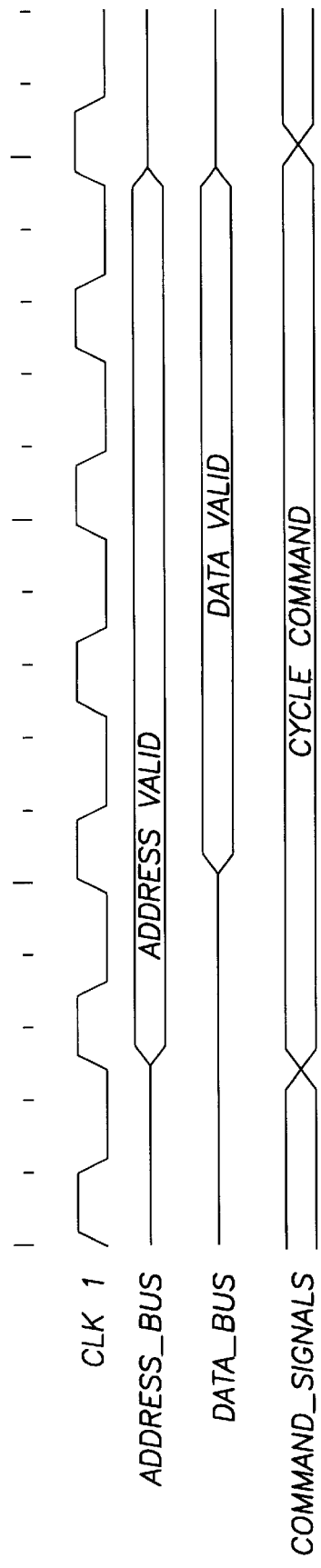
FIG. 1. is a typical example of the timing for a Parallel Bus Architecture.
Figure 2:
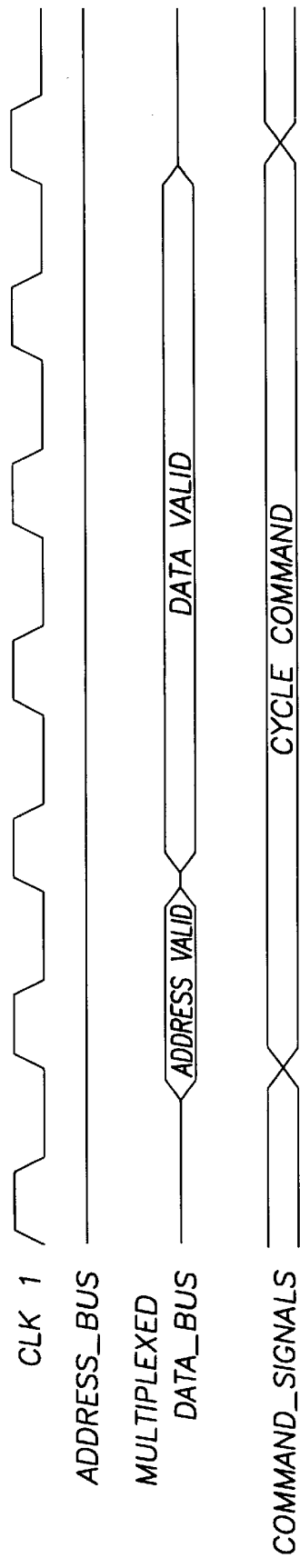
FIG. 2. is a typical example of the timing for a Multiplexed Bus Architecture.
Figure 3:
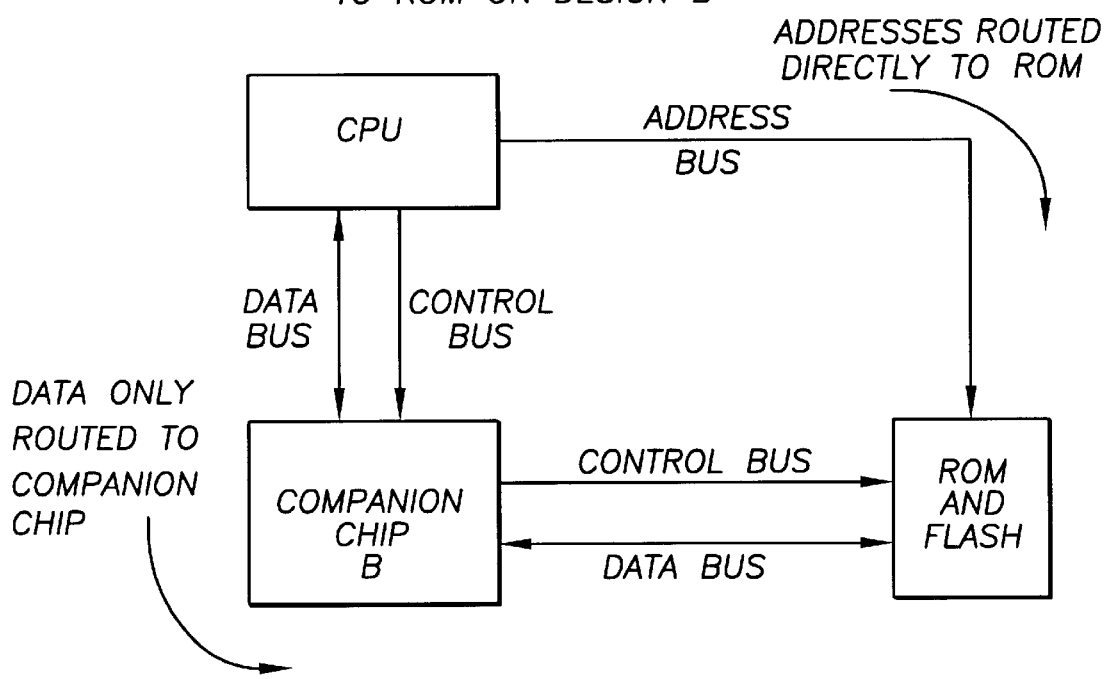
FIG. 3 is simplified functional block diagram of a Multiplexed Bus System.
Figure 4:
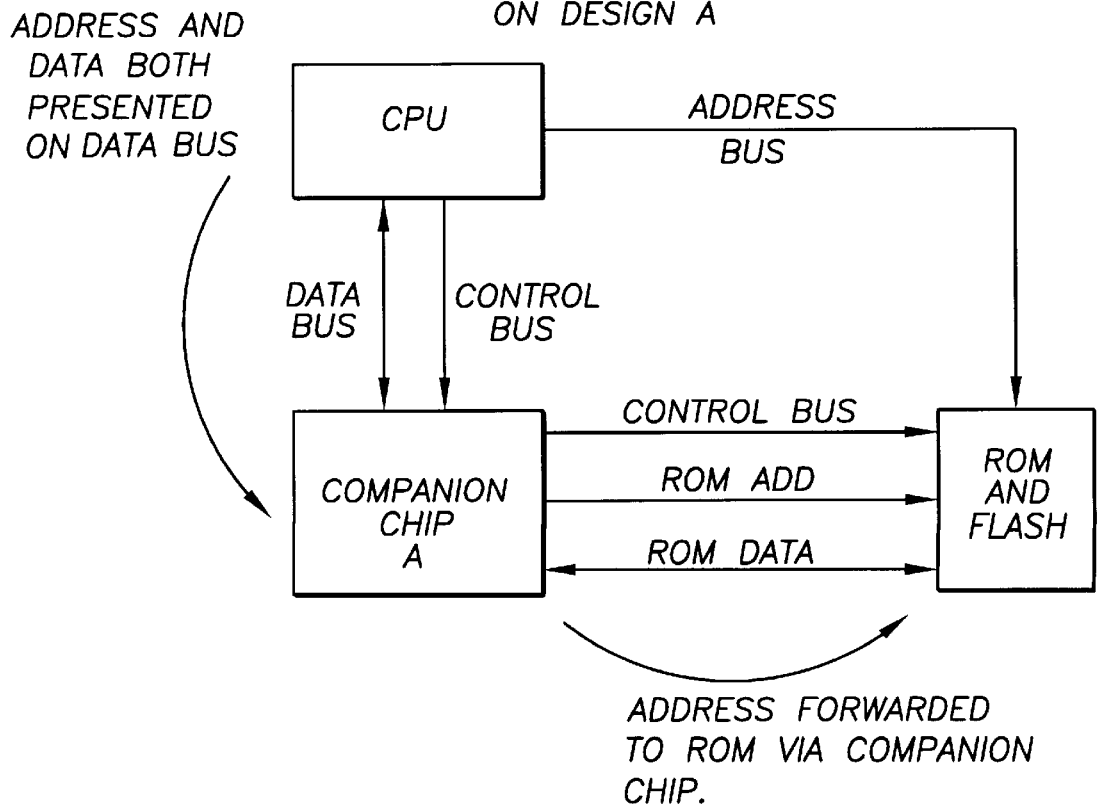
FIG. 4 is simplified functional block diagram of a Parallel Bus System.

Referring to FIG. 5, a combined multiplex and address bus system (Hereinafter the "system" 10) is shown. The system 10 comprises a Central Processing Unit (CPU) 12, a companion chip 14, and memory 16. The CPU 12 is coupled to a high order address bus 24, a data bus 26, and a control bus 28. The CPU 12 also comprises a bus control unit 22. Coupled to the control bus 28 and the data bus 26 is a companion chip 14. The companion chip 14 is comprised of a data decoder 18 and a FLASH write circuit 20. The system 10 is further comprised of memory 16 which is coupled to the high order address bus 24. The memory 16 is further coupled to the companion chip 14 via the control bus 34, the data bus 32 and the low order address bus 30.

In traditional computer systems, as discussed under the Related Art section, a CPU will operate in one of two modes, either a parallel bus mode, or a multiplexed bus mode. In the present invention the bus control 22 operates in a dual mode in which the address information is presented on the high order address bus 24 in a parallel bus fashion, while at substantially the same time, the data and the address information is multiplexed together and sent down the data bus 26 in a multiplexed bus fashion.

This dual mode makes it possible for the companion chip 14 to see the addresses when the CPU 12 communicates with the memory 16. This results in a memory map being generated, thus resulting in the ability to control how far into ROM space the CPU 12 is addressing. The combining of the two bus structures also allows limiting the number of PINs the companion chip 14 must have for the low order address bus 30 because the use of the high order address bus for the higher order address bits eliminates the need for a larger width low order address bus.

The functioning of the system 10 is as follows. The CPU 12 operates in a dual mode by having its bus control 22 transmit the high order address information on the high order address bus 24, while at substantially the same time, the complete address information multiplexed with the data information is transmitted upon the data bus 26. The memory 16 receives its high order address information from the high order address bus 24 to which it is coupled. The companion chip 14 receives the multiplexed information from the data bus 26 to which it is coupled. The data decoder 18, within the companion chip 14, decodes the multiplexed information received from the data bus 26. This use of the companion chip 14 and its data decoder 18 decode logic, in combination with a separate high order address bus 24 is a very unique feature of the present invention. The companion chip 14 places the low order address information upon the low order address bus 30, and the data information upon the data bus 32. By having the memory 16 receive the high order address from the high order address bus 24, all of the high order address decoding of the multiplexed address information is not required to be done. The decreased decoding requirements of the companion chip 14 increases the resources of the companion chip 14 for other operations.

This method of addressing also allows a very large memory space to be addressed by the CPU 12 (sometimes known as ROM space). For example, while a typical memory 16 consisting of ROM might be relatively small, (typically 4 Mbytes in size), the present invention's unique method of using both a high order address bus 24 and a low order address bus 30 allows the creation of a larger CPU 12 ROM space without increasing the PIN count for the companion chip 14. The combining of the two address busses allows limiting the number of PINs the companion chip 14 must have for the low order address bus 30 because the use of the high order address bus for the higher order address bits eliminates the need for a larger width low order address bus from the companion chip 14 to the memory 16. The ability to utilize the high order address bus and not increase the width of the low order address bus can result in saving as much as 25 PINs at the companion chip 14, a significant cost factor.

This feature of decoding and transmitting the low order addresses for the memory 16 is a central part of the present invention. This allows a system 10 in which the CPU 12 may possess a very large ROM address space. For instance, in a typical CPU architecture, the address space the CPU 12 may address is split into different areas. If a very large CPU 12 ROM address space is assigned to ROM, such as 64 MEG, it may not be possible to utilize this amount of ROM space because the actual ROM is not that large, or if the desired ROM is that large, the addition of more address PINs to the companion chip may not be possible. The present invention however, allows the companion chip 14 to be able to see the entire address that has been transmitted via the multiplexed data bus 26. The low order address may then be decoded from the multiplexed information and may then be transmitted via the low order address bus 30, thus eliminating the need for additional PINs from the CPU 12. Additionally, if the CPU 12 ROM address space is larger than the actual memory 16, the companion chip 14, because of receiving the multiplexed address information on the data bus 26, is able to see and thus be programmed to segregate the ROM address space of the CPU 12. Once segregated, the ROM address space may be allocated to other peripheral devices such as RAM, FLASH, or as desired. This segregation allows making full and efficient use of the CPU 12 ROM address space. The use of the multiplexed address information also allows a full address decode all the way down to the low order bits as the decode logic is already present in the companion chip 14 thereby generating a full memory map of the CPU 12 ROM space.

An additional feature of the present invention allows for varying the widths of the high order address bus 24, and the low order address 30. The actual bus widths may be selected to optimize the addressing of the memory 16 and overall system 10 operation. For example, address lines 0:20 may be routed through the companion chip 14, while address lines 21 and 22 are routed directly from the CPU 12 to the memory 16. This allows the companion chip 14 to directly access the memory 16 if desired. This feature of the present invention could also result in the elimination of the address lines completely from the companion chip 14 to the memory 16. The multiplexed information on the data bus 26 would still however allow the use of the address information for the control logic's memory map, which is required if the CPU 12 ROM address space is to be split up.

The control bus 28 and control bus 34 are used to control the operation of the system 10 for such things as sending ADDRESS_VALID, CHIP_SELECT, and other controls such as whether the current cycle is a READ or a WRITE operation. The use of the control bus 28 and control bus 34 is standard and well known to those skilled in the art.

The FLASH write circuit 20 is used to enable the writing of information to FLASH memory if used in the present invention.

Although the invention has been particularly shown and described with reference to a preferred embodiment thereof, it will be understood by those skilled in the art that changes in form and detail may be made therein without departing from the spirit and scope of the invention.

What is claimed is:

1. A memory addressing system, comprising:
    a CPU configured and arranged for operating both an address bus and a multiplexed data/address bus concurrently for communicatively coupling to a memory storage means;
    a companion chip coupled to the multiplexed data/address bus for receiving and for decoding a first order address from said multiplexed data/address bus, the companion chip configured and arranged to decode addresses from the multiplexed data/address bus for the memory storage means while generating corresponding control signals for the memory storage means; and
    the memory storage means coupled to each of said address bus for receiving a second order address from said address bus and coupled to said companion chip for receiving said first order address and the control signals from said companion chip.

2. The system of claim 1 wherein said companion chip further comprises data decoding means for decoding data from said multiplexed data/address bus.

3. The system of claim 2 further comprising data bus means coupled to said companion chip and to said memory storage means for transmission of said data between said companion chip and said memory storage means.

4. The system of claim 1 further comprising first address bus means coupled to said companion chip and to said memory storage means for transmitting said first address from said companion chip to said memory storage means.

5. The system of claim 1 wherein said memory storage means comprises non-volatile memory.

6. The system of claim 5 wherein said non-volatile memory comprises ROM.

7. The system of claim 5 wherein said non-volatile memory comprises FLASH memory.

8. The system of claim 7 wherein said companion chip further comprises a FLASH write circuit.

9. The system of claim 1 wherein said CPU further comprises bus control means for transmitting information on both of said multiplexed data/address bus and said multiplexed data/address bus and said address bus at substantially the same time.

10. The system of claim 9 further comprising a first address bus coupled to said companion chip and to said memory storage means for transmitting said first address from said companion chip to said memory storage means.

11. The system of claim 1 wherein said memory storage means comprises non-volatile memory for transmitting said low order address from said companion chip means to said memory storage means.

12. The system of claim 11 wherein said non-volatile memory comprises ROM.

13. The system of claim 12 wherein said non-volatile memory comprises FLASH memory.

14. The system of claim 13 wherein said companion chip means further comprises a FLASH write circuit.

15. The system of claim 4 wherein said address bus and said first address bus are variable width buses.

16. The system of claim 1, wherein the companion chip is further configured and arranged to decode addresses from the multiplexed data/address bus for the memory storage means while generating corresponding control signals for the memory storage means, without requiring regeneration of addresses for the memory storage means.

* * * * *